United States Patent
Herz

(10) Patent No.: US 8,260,320 B2
(45) Date of Patent: Sep. 4, 2012

(54) LOCATION SPECIFIC CONTENT

(75) Inventor: Scott Herz, San Jose, CA (US)

(73) Assignee: Apple Inc., Cupertino, CA (US)

( * ) Notice: Subject to any disclaimer, the term of this patent is extended or adjusted under 35 U.S.C. 154(b) by 617 days.

(21) Appl. No.: 12/270,814

(22) Filed: Nov. 13, 2008

(65) Prior Publication Data

US 2010/0120450 A1    May 13, 2010

(51) Int. Cl.
 *H04W 24/00* (2009.01)
(52) U.S. Cl. ............. 455/456.3; 455/456.1; 455/456.2
(58) Field of Classification Search ............. 455/456.1, 455/456.2, 456.3
 See application file for complete search history.

(56) References Cited

U.S. PATENT DOCUMENTS

| | | |
|---|---|---|
| 4,907,159 A | 3/1990 | Mauge et al. |
| 4,999,783 A | 3/1991 | Tenmoku et al. |
| 5,046,011 A | 9/1991 | Kakihara et al. |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,208,763 A | 5/1993 | Hong et al. |
| 5,218,629 A | 6/1993 | Dumond, Jr. et al. |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,339,391 A | 8/1994 | Wroblewski et al. |
| 5,371,678 A | 12/1994 | Nomura |
| 5,374,933 A | 12/1994 | Kao |
| 5,390,125 A | 2/1995 | Sennott et al. |
| 5,406,490 A | 4/1995 | Braegas |
| 5,416,712 A | 5/1995 | Geier et al. |
| 5,463,725 A | 10/1995 | Henckel |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,523,950 A | 6/1996 | Peterson |
| 5,627,547 A | 5/1997 | Ramaswamy et al. |
| 5,627,549 A | 5/1997 | Park |

(Continued)

FOREIGN PATENT DOCUMENTS

DE    3 621 456    1/1988

(Continued)

OTHER PUBLICATIONS

U.S. Appl. No. 60/946,813, filed Jun. 28, 2007, Forstall et al.

(Continued)

*Primary Examiner* — Charles Appiah
*Assistant Examiner* — Joshua Schwartz
(74) *Attorney, Agent, or Firm* — Fish & Richardson P.C.

(57) ABSTRACT

Systems, methods, and computer program products communicate location information associated with a device, such as a mobile device, to a server. Content identified by the server is received at the device, from the server and/or from a content service. The content can include an application associated with the location information. The content received at the device is displayed on the device only while the device is at or near a particular location identified by the location information.

24 Claims, 7 Drawing Sheets

U.S. PATENT DOCUMENTS

| | | | |
|---|---|---|---|
| 5,630,206 A | 5/1997 | Urban et al. |
| 5,646,853 A | 7/1997 | Takahashi et al. |
| 5,654,908 A | 8/1997 | Yokoyama |
| 5,663,732 A | 9/1997 | Stangeland et al. |
| 5,675,573 A | 10/1997 | Karol et al. |
| 5,677,837 A | 10/1997 | Reynolds |
| 5,689,252 A | 11/1997 | Ayanoglu et al. |
| 5,689,270 A | 11/1997 | Kelley et al. |
| 5,689,431 A | 11/1997 | Rudow et al. |
| 5,708,478 A | 1/1998 | Tognazzini |
| 5,745,865 A | 4/1998 | Rostoker et al. |
| 5,748,109 A | 5/1998 | Kosaka et al. |
| 5,752,186 A | 5/1998 | Malackowski et al. |
| 5,754,430 A | 5/1998 | Sawada |
| 5,774,824 A | 6/1998 | Streit et al. |
| 5,774,829 A | 6/1998 | Cisneros et al. |
| 5,796,365 A | 8/1998 | Lewis et al. |
| 5,796,613 A | 8/1998 | Kato et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,873,068 A | 2/1999 | Beaumont et al. |
| 5,887,269 A | 3/1999 | Brunts et al. |
| 5,892,454 A | 4/1999 | Schipper et al. |
| 5,899,954 A | 5/1999 | Sato |
| 5,905,451 A | 5/1999 | Sakashita |
| 5,908,465 A | 6/1999 | Ito et al. |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |
| 5,941,930 A | 8/1999 | Morimoto et al. |
| 5,941,934 A | 8/1999 | Sato |
| 5,948,040 A | 9/1999 | DeLorme et al. |
| 5,948,061 A | 9/1999 | Merriman et al. |
| 5,955,973 A | 9/1999 | Anderson |
| 5,959,580 A | 9/1999 | Maloney et al. |
| 5,968,109 A | 10/1999 | Israni et al. |
| 5,982,298 A | 11/1999 | Lappenbusch et al. |
| 5,982,324 A | 11/1999 | Watters et al. |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,607 A | 1/2000 | Yagyu et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,067,502 A | 5/2000 | Hayashida et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,087,965 A | 7/2000 | Murphy |
| 6,088,594 A | 7/2000 | Kingdon et al. |
| 6,092,076 A | 7/2000 | McDonough et al. |
| 6,094,607 A | 7/2000 | Diesel |
| 6,101,443 A | 8/2000 | Kato |
| 6,104,931 A | 8/2000 | Havinis et al. |
| 6,108,555 A | 8/2000 | Maloney et al. |
| 6,115,611 A | 9/2000 | Kimoto et al. |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,188,959 B1 | 2/2001 | Schupfner |
| 6,195,557 B1 | 2/2001 | Havinis et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,933 B1 | 5/2001 | Lang |
| 6,249,252 B1 | 6/2001 | Dupray |
| 6,252,543 B1 | 6/2001 | Camp |
| 6,266,612 B1 | 7/2001 | Dussell et al. |
| 6,272,342 B1 | 8/2001 | Havinis et al. |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,324,692 B1 | 11/2001 | Fiske |
| 6,332,127 B1 | 12/2001 | Bandera et al. |
| 6,339,437 B1 | 1/2002 | Nielsen |
| 6,339,746 B1 | 1/2002 | Sugiyama et al. |
| 6,343,317 B1 | 1/2002 | Glorikian |
| 6,351,235 B1 | 2/2002 | Stilp |
| 6,356,763 B1 | 3/2002 | Kangas et al. |
| 6,356,836 B1 | 3/2002 | Adolph |
| 6,356,838 B1 | 3/2002 | Paul |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,405,034 B1 | 6/2002 | Tijerino |
| 6,411,899 B2 | 6/2002 | Dussell et al. |
| 6,415,207 B1 | 7/2002 | Jones |
| 6,415,220 B1 | 7/2002 | Kovacs |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |
| 6,449,485 B1 | 9/2002 | Anzil |
| 6,456,956 B1 | 9/2002 | Xiong |
| 6,459,782 B1 | 10/2002 | Bedrosian et al. |
| 6,463,289 B1 | 10/2002 | Havinis et al. |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,505,048 B1 | 1/2003 | Moles et al. |
| 6,507,802 B1 | 1/2003 | Payton et al. |
| 6,516,197 B2 | 2/2003 | Havinis et al. |
| 6,519,463 B2 | 2/2003 | Tendler |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,546,360 B1 | 4/2003 | Gilbert et al. |
| 6,552,682 B1 | 4/2003 | Fan |

| Patent No. | Date | Name |
|---|---|---|
| 6,563,430 B1 | 5/2003 | Kemink et al. |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,597,305 B2 | 7/2003 | Szeto et al. |
| 6,611,788 B1 | 8/2003 | Hussa |
| 6,650,902 B1 | 11/2003 | Richton |
| 6,650,997 B2 | 11/2003 | Funk |
| 6,662,016 B1 | 12/2003 | Buckham et al. |
| 6,662,023 B1 | 12/2003 | Helle |
| 6,667,963 B1 | 12/2003 | Rantalainen et al. |
| 6,671,377 B1 | 12/2003 | Havinis et al. |
| 6,674,849 B1 | 1/2004 | Froeberg |
| 6,680,694 B1 | 1/2004 | Knockeart et al. |
| 6,683,538 B1 | 1/2004 | Wilkes, Jr. |
| 6,697,734 B1 | 2/2004 | Suomela |
| 6,711,408 B1 | 3/2004 | Raith |
| 6,718,344 B2 | 4/2004 | Hirono |
| 6,721,572 B1 | 4/2004 | Smith et al. |
| 6,732,047 B1 | 5/2004 | de Silva |
| 6,738,808 B1 | 5/2004 | Enzmann et al. |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,762,772 B1 | 7/2004 | Imamura et al. |
| 6,766,174 B1 | 7/2004 | Kenyon |
| 6,781,575 B1 | 8/2004 | Hawkins et al. |
| 6,782,278 B2 | 8/2004 | Chen et al. |
| 6,789,012 B1 | 9/2004 | Childs et al. |
| 6,801,855 B1 | 10/2004 | Walters et al. |
| 6,813,501 B2 | 11/2004 | Kinnunen et al. |
| 6,813,503 B1 | 11/2004 | Zillikens et al. |
| 6,819,919 B1 | 11/2004 | Tanaka |
| 6,823,188 B1 | 11/2004 | Stern |
| 6,847,969 B1 | 1/2005 | Mathai et al. |
| 6,859,149 B1 | 2/2005 | Ohta |
| 6,865,483 B1 | 3/2005 | Cook, III et al. |
| 6,871,144 B1 | 3/2005 | Lee |
| 6,882,313 B1 | 4/2005 | Fan et al. |
| 6,909,902 B1 | 6/2005 | Sawada et al. |
| 6,912,398 B1 | 6/2005 | Domnitz |
| 6,914,626 B2 | 7/2005 | Squibbs |
| 6,915,208 B2 | 7/2005 | Garin et al. |
| 6,933,841 B2 | 8/2005 | Muramatsu et al. |
| 6,948,656 B2 | 9/2005 | Williams |
| 6,952,181 B2 | 10/2005 | Karr et al. |
| 6,954,646 B2 | 10/2005 | Churt |
| 6,954,735 B1 | 10/2005 | Djupsjobacka et al. |
| 6,957,072 B2 | 10/2005 | Kangras et al. |
| 6,990,495 B1 | 1/2006 | Grason et al. |
| 6,999,779 B1 | 2/2006 | Hashimoto |
| 7,003,289 B1 | 2/2006 | Kolls |
| 7,031,725 B2 | 4/2006 | Rorabaugh |
| 7,058,594 B2 | 6/2006 | Stewart |
| 7,076,255 B2 | 7/2006 | Parupudi et al. |
| 7,082,365 B2 | 7/2006 | Sheha et al. |
| 7,089,264 B1 | 8/2006 | Guido et al. |
| 7,096,029 B1 | 8/2006 | Parupudi et al. |
| 7,103,470 B2 | 9/2006 | Mintz |
| 7,120,469 B1 | 10/2006 | Urakawa |
| 7,123,926 B2 | 10/2006 | Himmelstein |
| 7,146,298 B2 | 12/2006 | Motamedi et al. |
| 7,151,921 B2 | 12/2006 | Otsuka |
| 7,171,190 B2 | 1/2007 | Ye et al. |
| 7,181,189 B2 | 2/2007 | Hotta et al. |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,236,883 B2 | 6/2007 | Garin et al. |
| 7,254,481 B2 | 8/2007 | Yamada et al. |
| 7,260,378 B2 | 8/2007 | Holland et al. |
| 7,266,376 B2 | 9/2007 | Nakagawa |
| 7,269,601 B2 | 9/2007 | Kinno et al. |
| 7,271,765 B2 | 9/2007 | Stilp et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,556 B2 | 11/2007 | Roese et al. |
| 7,295,925 B2 | 11/2007 | Breed et al. |
| 7,298,327 B2 | 11/2007 | Dupray et al. |
| 7,299,008 B2 | 11/2007 | Gluck |
| 7,310,516 B1 | 12/2007 | Vacanti |
| 7,313,467 B2 | 12/2007 | Breed et al. |
| 7,319,412 B1 | 1/2008 | Coppinger et al. |
| 7,336,949 B2 | 2/2008 | Nasielski |
| 7,373,246 B2 | 5/2008 | O'Clair |
| 7,386,396 B2 | 6/2008 | Johnson |
| 7,389,179 B2 | 6/2008 | Jin et al. |
| 7,392,017 B2 | 6/2008 | Chu et al. |
| 7,395,031 B1 | 7/2008 | Ritter |
| 7,418,402 B2 | 8/2008 | McCrossin et al. |
| 7,421,422 B1 | 9/2008 | Dempster et al. |
| 7,421,486 B1 | 9/2008 | Parupudi et al. |
| 7,426,437 B2 | 9/2008 | Breed et al. |
| 7,427,021 B1 | 9/2008 | Kemper et al. |
| 7,433,694 B2 | 10/2008 | Morgan et al. |
| 7,440,842 B1 | 10/2008 | Vorona |
| 7,466,235 B1 | 12/2008 | Kolb et al. |
| 7,483,944 B2 | 1/2009 | Parupudi et al. |
| 7,486,201 B2 | 2/2009 | Kelly et al. |
| 7,500,607 B2 | 3/2009 | Williams |
| 7,512,487 B1 | 3/2009 | Golding et al. |
| 7,522,927 B2 | 4/2009 | Fitch et al. |
| 7,525,484 B2 | 4/2009 | Dupray et al. |
| 7,536,388 B2 | 5/2009 | Jung et al. |
| 7,545,281 B2 | 6/2009 | Richards et al. |
| 7,558,696 B2 | 7/2009 | Vilppula et al. |
| 7,565,132 B2 | 7/2009 | Ben Ayed |
| 7,565,157 B1 | 7/2009 | Ortega et al. |
| 7,574,222 B2 | 8/2009 | Sawada et al. |
| 7,577,448 B2 | 8/2009 | Pande et al. |
| 7,587,345 B2 | 9/2009 | Mann et al. |
| 7,593,991 B2 | 9/2009 | Friedman et al. |
| 7,599,795 B1 | 10/2009 | Blumberg et al. |
| 7,603,233 B2 | 10/2009 | Tashiro |
| 7,606,580 B2 | 10/2009 | Granito et al. |
| 7,617,044 B2 | 11/2009 | Lee |
| 7,620,404 B2 | 11/2009 | Chesnais et al. |
| 7,623,848 B2 | 11/2009 | Rosenfelt et al. |
| 7,624,358 B2 | 11/2009 | Kim et al. |
| 7,647,174 B2 | 1/2010 | Kwon |
| 7,680,591 B2 | 3/2010 | Nagaa et al. |
| 7,689,916 B1 | 3/2010 | Goel et al. |
| 7,710,290 B2 | 5/2010 | Johnson |
| 7,711,478 B2 | 5/2010 | Gluck |
| 7,714,778 B2 | 5/2010 | Dupray |
| 7,739,040 B2 | 6/2010 | Horvitz |
| 7,743,074 B1 | 6/2010 | Parupudi et al. |
| 7,756,639 B2 | 7/2010 | Colley et al. |
| 7,768,395 B2 | 8/2010 | Gold |
| 7,792,273 B2 | 9/2010 | Fano et al. |
| 7,811,203 B2 | 10/2010 | Unuma et al. |
| 7,817,033 B2 | 10/2010 | Motoyama |
| 7,848,388 B2 | 12/2010 | Tudosoiu |
| 7,848,765 B2 | 12/2010 | Phillips et al. |
| 7,860,758 B2 | 12/2010 | McCrossin et al. |
| 7,890,123 B2 | 2/2011 | Granito et al. |
| 7,933,612 B2 | 4/2011 | Counts et al. |
| 7,933,929 B1 | 4/2011 | McClendon et al. |
| 7,941,188 B2 | 5/2011 | Jung et al. |
| 7,979,350 B1 | 7/2011 | Carion |
| 8,036,630 B2 | 10/2011 | Park et al. |
| 8,046,009 B2 | 10/2011 | Bodmer et al. |
| 2001/0046884 A1 | 11/2001 | Yoshioka |
| 2002/0032035 A1 | 3/2002 | Teshima |
| 2002/0067353 A1 | 6/2002 | Kenyon et al. |
| 2002/0077144 A1 | 6/2002 | Keller et al. |
| 2002/0087505 A1 | 7/2002 | Smith et al. |
| 2002/0095486 A1 | 7/2002 | Bahl |
| 2002/0126146 A1 | 9/2002 | Burns et al. |
| 2002/0128773 A1 | 9/2002 | Chowanic et al. |
| 2002/0132625 A1 | 9/2002 | Ogino et al. |
| 2002/0173905 A1 | 11/2002 | Jin et al. |
| 2003/0014181 A1 | 1/2003 | Myr |

| | | | | | | |
|---|---|---|---|---|---|---|
| 2003/0016804 A1 | 1/2003 | Sheha et al. | | 2006/0247855 A1 | 11/2006 | de Silva et al. |
| 2003/0032404 A1 | 2/2003 | Wager et al. | | 2006/0251034 A1 | 11/2006 | Park |
| 2003/0055560 A1 | 3/2003 | Phillips | | 2006/0270421 A1 | 11/2006 | Phillips et al. |
| 2003/0060212 A1 | 3/2003 | Thomas | | 2006/0271280 A1 | 11/2006 | O'Clair |
| 2003/0060215 A1 | 3/2003 | Graham | | 2006/0291639 A1 | 12/2006 | Radziewicz et al. |
| 2003/0060973 A1 | 3/2003 | Mathews et al. | | 2006/0293083 A1 | 12/2006 | Bowen |
| 2003/0060976 A1 | 3/2003 | Sato et al. | | 2007/0003040 A1 | 1/2007 | Radziewicz et al. |
| 2003/0065934 A1 | 4/2003 | Angelo et al. | | 2007/0006098 A1* | 1/2007 | Krumm et al. ............... 715/825 |
| 2003/0069683 A1 | 4/2003 | Lapidot et al. | | 2007/0008515 A1 | 1/2007 | Otani et al. |
| 2003/0078054 A1 | 4/2003 | Okuda | | 2007/0027614 A1 | 2/2007 | Reeser et al. |
| 2003/0078055 A1 | 4/2003 | Smith et al. | | 2007/0027628 A1 | 2/2007 | Geelen |
| 2003/0078057 A1 | 4/2003 | Watanabe et al. | | 2007/0061301 A1 | 3/2007 | Ramer et al. |
| 2003/0093217 A1 | 5/2003 | Petzold et al. | | 2007/0071114 A1 | 3/2007 | Sanderford et al. |
| 2003/0096620 A1 | 5/2003 | Ozturk et al. | | 2007/0087726 A1 | 4/2007 | McGary et al. |
| 2003/0100334 A1 | 5/2003 | Mazzara, Jr. | | 2007/0115868 A1 | 5/2007 | Chen et al. |
| 2003/0120423 A1 | 6/2003 | Cochlovius et al. | | 2007/0124058 A1 | 5/2007 | Kitagawa et al. |
| 2003/0140136 A1 | 7/2003 | Nakamura | | 2007/0127661 A1 | 6/2007 | Didcock |
| 2003/0148774 A1 | 8/2003 | Naghian et al. | | 2007/0142026 A1 | 6/2007 | Kuz et al. |
| 2003/0158655 A1 | 8/2003 | Obradovich et al. | | 2007/0155360 A1 | 7/2007 | An |
| 2003/0191578 A1 | 10/2003 | Paulauskas et al. | | 2007/0162224 A1 | 7/2007 | Luo |
| 2004/0010358 A1 | 1/2004 | Oesterling et al. | | 2007/0184855 A1 | 8/2007 | Klassen et al. |
| 2004/0059502 A1 | 3/2004 | Levi et al. | | 2007/0191029 A1 | 8/2007 | Zarem et al. |
| 2004/0068439 A1 | 4/2004 | Elgrably | | 2007/0200713 A1 | 8/2007 | Weber et al. |
| 2004/0072577 A1 | 4/2004 | Myllymaki et al. | | 2007/0208492 A1 | 9/2007 | Downs et al. |
| 2004/0073361 A1 | 4/2004 | Tzamaloukas et al. | | 2007/0208497 A1 | 9/2007 | Downs et al. |
| 2004/0082351 A1 | 4/2004 | Westman | | 2007/0208498 A1 | 9/2007 | Barker et al. |
| 2004/0083050 A1 | 4/2004 | Biyani | | 2007/0218925 A1 | 9/2007 | Islam et al. |
| 2004/0093155 A1 | 5/2004 | Simonds | | 2007/0229549 A1 | 10/2007 | Dicke et al. |
| 2004/0104842 A1 | 6/2004 | Drury et al. | | 2007/0232272 A1 | 10/2007 | Gonsalves et al. |
| 2004/0180669 A1 | 9/2004 | Kall | | 2007/0238491 A1 | 10/2007 | He |
| 2004/0192299 A1 | 9/2004 | Wilson et al. | | 2007/0243853 A1 | 10/2007 | Bumiller et al. |
| 2004/0198335 A1 | 10/2004 | Campen | | 2007/0247435 A1 | 10/2007 | Benko et al. |
| 2004/0198397 A1 | 10/2004 | Weiss | | 2007/0259674 A1 | 11/2007 | Neef et al. |
| 2004/0203569 A1 | 10/2004 | Jijina et al. | | 2007/0266116 A1 | 11/2007 | Rensin et al. |
| 2004/0203746 A1 | 10/2004 | Knauerhase et al. | | 2007/0281664 A1 | 12/2007 | Kaneko et al. |
| 2004/0203880 A1 | 10/2004 | Riley | | 2007/0282565 A1 | 12/2007 | Bye et al. |
| 2004/0215707 A1 | 10/2004 | Fujita et al. | | 2007/0290920 A1 | 12/2007 | Shintai et al. |
| 2004/0225436 A1 | 11/2004 | Yoshihashi | | 2008/0004789 A1 | 1/2008 | Horvitz et al. |
| 2004/0263084 A1 | 12/2004 | Mor et al. | | 2008/0004791 A1 | 1/2008 | Sera |
| 2005/0009511 A1 | 1/2005 | Bostrom et al. | | 2008/0032721 A1 | 2/2008 | MacDonald et al. |
| 2005/0033515 A1 | 2/2005 | Bozzone | | 2008/0046176 A1 | 2/2008 | Jurgens |
| 2005/0037781 A1 | 2/2005 | Ozugur et al. | | 2008/0065311 A1 | 3/2008 | Bauchot et al. |
| 2005/0039140 A1 | 2/2005 | Chen | | 2008/0088486 A1 | 4/2008 | Rozum et al. |
| 2005/0046584 A1 | 3/2005 | Breed | | 2008/0096518 A1 | 4/2008 | Mock et al. |
| 2005/0071078 A1 | 3/2005 | Yamada et al. | | 2008/0113672 A1 | 5/2008 | Karr et al. |
| 2005/0071702 A1 | 3/2005 | Morisawa | | 2008/0160956 A1 | 7/2008 | Jackson et al. |
| 2005/0075116 A1 | 4/2005 | Laird | | 2008/0167796 A1 | 7/2008 | Narayanaswami |
| 2005/0091408 A1* | 4/2005 | Parupudi et al. ............... 709/246 | | 2008/0178116 A1 | 7/2008 | Kim |
| 2005/0130677 A1 | 6/2005 | Meunier et al. | | 2008/0186162 A1 | 8/2008 | Rajan et al. |
| 2005/0134440 A1 | 6/2005 | Breed | | 2008/0194273 A1 | 8/2008 | Kansal et al. |
| 2005/0134578 A1 | 6/2005 | Chambers et al. | | 2008/0200142 A1 | 8/2008 | Abdel-Kader et al. |
| 2005/0176411 A1 | 8/2005 | Taya | | 2008/0207167 A1 | 8/2008 | Bugenhagen |
| 2005/0186954 A1 | 8/2005 | Kenney | | 2008/0225779 A1 | 9/2008 | Bragiel et al. |
| 2005/0192025 A1 | 9/2005 | Kaplan | | 2008/0227473 A1 | 9/2008 | Haney |
| 2005/0203698 A1 | 9/2005 | Lee | | 2008/0233919 A1 | 9/2008 | Kenney |
| 2005/0221799 A1 | 10/2005 | Tervo et al. | | 2008/0248815 A1 | 10/2008 | Busch |
| 2005/0222763 A1 | 10/2005 | Uyeki | | 2008/0268876 A1 | 10/2008 | Gelfand et al. |
| 2005/0234637 A1 | 10/2005 | Obradovich et al. | | 2008/0271072 A1 | 10/2008 | Rothschild et al. |
| 2005/0256639 A1 | 11/2005 | Aleksic et al. | | 2008/0284642 A1 | 11/2008 | Seacat et al. |
| 2006/0009908 A1 | 1/2006 | Tomita et al. | | 2008/0287124 A1 | 11/2008 | Karabinis |
| 2006/0025158 A1 | 2/2006 | Leblanc et al. | | 2008/0288166 A1 | 11/2008 | Onishi |
| 2006/0038719 A1 | 2/2006 | Pande et al. | | 2008/0293397 A1 | 11/2008 | Gajdos et al. |
| 2006/0041374 A1 | 2/2006 | Inoue | | 2008/0310850 A1 | 12/2008 | Pederson et al. |
| 2006/0056388 A1 | 3/2006 | Livingwood | | 2008/0318550 A1 | 12/2008 | DeAtley |
| 2006/0063539 A1 | 3/2006 | Beyer, Jr. | | 2008/0319644 A1 | 12/2008 | Zehler |
| 2006/0069503 A1 | 3/2006 | Suomela | | 2008/0319652 A1 | 12/2008 | Moshfeghi |
| 2006/0101005 A1 | 5/2006 | Yang et al. | | 2009/0003659 A1 | 1/2009 | Forstall et al. |
| 2006/0116137 A1 | 6/2006 | Jung | | 2009/0005071 A1 | 1/2009 | Forstall et al. |
| 2006/0148463 A1 | 7/2006 | Zhu et al. | | 2009/0018769 A1 | 1/2009 | Poliak |
| 2006/0149461 A1 | 7/2006 | Rowley | | 2009/0030605 A1 | 1/2009 | Breed |
| 2006/0150119 A1 | 7/2006 | Chesnais et al. | | 2009/0033540 A1 | 2/2009 | Breed et al. |
| 2006/0166679 A1 | 7/2006 | Karaoguz et al. | | 2009/0042585 A1 | 2/2009 | Matsuda |
| 2006/0168300 A1 | 7/2006 | An et al. | | 2009/0047979 A1 | 2/2009 | Oh et al. |
| 2006/0172769 A1 | 8/2006 | Oh | | 2009/0121927 A1 | 5/2009 | Moshfeghi |
| 2006/0172778 A1 | 8/2006 | Sundararajan et al. | | 2009/0143048 A1 | 6/2009 | Ayanamcottil et al. |
| 2006/0179114 A1 | 8/2006 | Deeds | | 2009/0197612 A1 | 8/2009 | Kiiskinen |
| 2006/0199567 A1 | 9/2006 | Alston | | 2009/0201850 A1 | 8/2009 | Davis |
| 2006/0218209 A1 | 9/2006 | Arrouye et al. | | 2009/0215469 A1 | 8/2009 | Fisher |
| 2006/0227047 A1 | 10/2006 | Rosenberg | | 2009/0228961 A1 | 9/2009 | Wald et al. |

| | | | |
|---|---|---|---|
| 2009/0234743 | A1 | 9/2009 | Wald et al. |
| 2009/0259573 | A1 | 10/2009 | Cheng et al. |
| 2009/0271271 | A1 | 10/2009 | Johnson |
| 2009/0281724 | A1 | 11/2009 | Blumenberg et al. |
| 2009/0286549 | A1 | 11/2009 | Canon et al. |
| 2009/0315766 | A1 | 12/2009 | Khosravy et al. |
| 2009/0315775 | A1 | 12/2009 | Khosravy et al. |
| 2009/0325603 | A1 | 12/2009 | Van Os et al. |
| 2009/0326815 | A1 | 12/2009 | Williamson et al. |
| 2010/0054242 | A1 | 3/2010 | Oliver |
| 2010/0070758 | A1 | 3/2010 | Low et al. |
| 2010/0082820 | A1 | 4/2010 | Furukawa |
| 2010/0106397 | A1 | 4/2010 | Van Essen |
| 2010/0131584 | A1 | 5/2010 | Johnson |
| 2010/0173647 | A1 | 7/2010 | Sheynblat |
| 2010/0207782 | A1 | 8/2010 | Johnson |
| 2010/0223006 | A1 | 9/2010 | Sasaki |
| 2010/0267357 | A1 | 10/2010 | Holmstrom et al. |
| 2010/0279652 | A1 | 11/2010 | Sharp et al. |
| 2010/0279673 | A1 | 11/2010 | Sharp et al. |
| 2011/0039513 | A1 | 2/2011 | Carlstrom |
| 2011/0051658 | A1 | 3/2011 | Jin et al. |

FOREIGN PATENT DOCUMENTS

| | | |
|---|---|---|
| DE | 19914257 | 3/1999 |
| EP | 0 288 068 | 7/1992 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 785 535 | 7/1997 |
| EP | 0 786 646 | 7/1997 |
| EP | 0 813 072 | 12/1997 |
| EP | 1 083 764 | 3/2001 |
| EP | 1 251 362 | 10/2002 |
| EP | 1 469 287 | 10/2004 |
| EP | 1 672 474 | 6/2006 |
| EP | 1 860 904 | 11/2007 |
| EP | 1 933 249 | 8/2008 |
| EP | 1 975 567 | 10/2008 |
| FR | 2754093 | 4/1998 |
| GB | 2 278 196 | 11/1994 |
| GB | 2 322 248 | 8/1998 |
| JP | 08-069436 | 3/1996 |
| JP | 09-054895 | 2/1997 |
| JP | 09-098474 | 4/1997 |
| JP | 9-113288 | 5/1997 |
| JP | 09-153125 | 6/1997 |
| JP | 09-200850 | 7/1997 |
| JP | 9-319300 | 12/1997 |
| JP | 10-021259 | 1/1998 |
| JP | 2001-008270 | 1/2001 |
| JP | 2005/277764 | 10/2005 |
| WO | WO 94/08250 | 4/1994 |
| WO | WO 97/41654 | 11/1997 |
| WO | WO 98/03951 | 1/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 02/33533 | 4/2002 |
| WO | WO 02/054813 | 7/2002 |
| WO | WO 03/096055 | 11/2003 |
| WO | WO 2004/034194 | 4/2004 |
| WO | WO 2005/006258 | 1/2005 |
| WO | WO 2005/084052 | 9/2005 |
| WO | WO 2007/027065 | 3/2007 |
| WO | WO 2007/052285 | 5/2007 |
| WO | WO 2009/002942 | 12/2008 |
| WO | WO 2009/140031 | 11/2009 |

OTHER PUBLICATIONS

Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Dey, "Context-Aware Computing: The CyberDesk Project," [online] Retrieved from the Internet: URL: http://www.cc.gatech.edu/fce/cyberdesk/pubs/AAAI98/AAAI98.html; AAAI '98 Spring Symposium, Stanford University, Mar. 23-25, 1998, downloaded from the Internet on Aug. 6, 2010, 8 pages.
"The Navizon Wireless Positioning System," [online] [Retrieved on Nov. 30, 2007]; Retrieved from the Internet URL: http://www.navizon.com/FullFeatures.htm, 7 pages.
Feddema et al., "Cooperative Sentry Vehicles and Differential GPS Leapfrog," 2000, United States Department of Energy, pp. 1-12.
Maxwell et al., "Alfred: The Robot Waiter Who Remembers You," AAAI Technical Report WS-99-15, 1999, 12 pages.
Challe, "CARMINAT—An Integrated information and guidance system," Vehicle Navigation and Information Systems Conference, Oct. 20-23, 1991, Renault—Direction de la Recherche, Rueil-Malmaison, France.
Pungel, "Traffic control-beat the jam electronically," Funkschau, 1988, 18:43-45 (w/English translation).
Rillings and Betsold, "Advanced driver information systems," Vehicular Technology, IEEE Vehicular Technology Society, 1991, 40:31-40.
Shibata et al., "Development and Integration of Generic Components for a Teachable Vision-Based Mobile Robot," IEEE/ASME Transactions on Mechatronics, 1996, 1(3):230-236.
Tsuzawa and Okamoto, "Advanced Mobile Traffic Information and Communication System," First Vehicle Navigation and Information Systems Conference, Sep. 11-13, 1989, Toronto, Canada, Abstract only.
Wong, "GPA: making roads safer and solving traffic tangles," Asia Engineer, 1995, 23(9):31-32.
Yogesh C. Rathod, Third Party Submission in U.S. Appl. No. 12/233,358 mailed Mar. 30, 2010, 12 pages.
"Sprite Terminator User Guide," [online] Dec. 6, 2007, pp. 1-45, Retrieved from the Internet: URL: http://www.spritesoftware.com/getmedia/4d2lad24-fd62-4c5e-a4fe-15ebc99aac9a/SpriteTerminator.aspx> [retrieved on Jul. 9, 2010].
Ayatsuka et al., "UbiquitousLinks. Hypermedia Links Embedded in the Real World, Technical Report of Information Processing Society, 96-HI-67," Information Processing Society of Japan, Jul. 11, 1996, 96(62):23-30.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Benefon ESC! GSM+GPS Personal Navigation Phone, benefon.com, Copyright 2001, 4 pages.
Freundschuh, "Does 'Anybody' Really Want (or Need) Vehicle Navigation Aids?" First Vehicle Navigation and Information System Conference, Sep. 11-13, 1989, Toronto, Canada, 5 pages.
Gould, "The Provision of Usable Navigation Assistance: Considering Individual Cognitive Ability," First Vehicle Navigation and Information System Conference, Sep. 11-13, 1989, Toronto, Canada, 7 pages.
Mark, "A Conceptual Model for Vehicle Navigation Systems," First Vehicle Navigation and Information System Conference, Sep. 11-13, 1989, Toronto, Canada, 11 pages.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pages.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Hoogenraad, "Location Dependent Services," 3rd AGILE Conference on Geographic Information Science, Helsinki/Espoo, Finland, May 25-27, 2000, pp. 74-77.

Bonsignore, "A Comparative Evaluation of the Benefits of Advanced Traveler Information System (ATIS) Operational Tests," MIT Masters Thesis, Feb. 1994, 140 pages.

Noonan and Shearer, "Intelligent Transportation Systems Field Operational Test Cross-Cutting Study Advance Traveler Information systems," Intelligent Transportation Systems Field Operational Test Cross-Cutting Study, Sep. 1998, 26 pages.

Burnett, "Usable Vehicle Navigation Systems: Are We There Yet?" Vehicle Electronic Systems 2000, Jun. 29-30, 2000, 3.1.1-3.1.12.

Khattak et al., "Bay Area ATIS Testbed Plan," Research Reports, California Partners for Advanced Transit and Highways (PATH), Institute of Transportation Studies, UC Berkeley, Jan. 1, 1992, 83 pages.

Yim et al., "Travinfo Field Operational Test: Work Plan for the Target, Network, and Value Added Reseller (VAR) Customer Studies," Working Papers, California Partners for Advanced Transit and Highways (PATH), Institute of Transportation Studies, UC Berkeley, Apr. 1, 1997, 49 pages.

Mahmassani et al., "Providing Advanced and Real-Time Travel/Traffic Information to Tourists," Center for Transportation Research, Bureau of Engineering Research, The University of Texas at Austin, Oct. 1998, 15 pages.

"New Handsets Strut Their Stuff at Wireless '99," Internet: URL: http://findarticles.com/p/articles/mi_m0BMD/is_1999_Feb_11/ai_n27547656/ downloaded from Internet on Feb. 11, 1999, 3 pages.

"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

Green et al., "Suggested Human Factors Design Guidelines for Driver Information Systems," Technical Report UMTRI-93-21, Nov. 1993, 119 pages.

Tijerina et al., "Driver Workload Assessment of Route Guidance System Destination Entry While Driving: A Test Track Study," Proceedings of the 5th ITS World Congress, Oct. 12-16, 1998, Seoul, Korea, 9 pages.

Muraskin, "Two-Minute Warnings for School Bus Riders," Internet: URL: http://www.callcentermagazine.com/shared/printableArticle.jhtml;jsessionid=PQH1SZXW... Jul. 1, 1999, 3 pages.

Ni and Deakin, "On-Board Advanced Traveler Information Systems," Dec. 1, 2002, 10 pages.

Serafin et al., "Functions and Features of Future Driver Information Systems," Technical Report UMTRI-91-16, May 1991, 104 pages.

Shekhar and Liu, "Genesis and Advanced Traveler Information Systems (ATIS): Killer Applications for Mobile Computing?" NSF Mobidata Workshop on Mobile and Wireless Information Systems, Nov. 1994, 20 pages.

"LaBarge in joint venture on bus system," Internet: URL: http://www.bizjournals.com/stlouis/stories/1998/08/10/focus2.html?t-printable, Aug. 7, 1998, 1 page.

Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.

Zubac and Strahonja, "Theory and Development of an Online Navigation System," 18th International Conference on Information and Intelligent Systems, University of Zagreb, Sep. 12-14, 2007.

Brown, "The stick-e document: a framework for creating context-aware applications," Electronic Publishing, 1995, 8:259-272.

Brown, "Triggering Information by Context," Personal Technologies, 1998, 2:18-27.

Dey et al., "CyberDesk: a framework for providing self-integrating context-aware services," Knowledge-Based Systems, 1998, 11:3-13.

Hodes and Katz, "Composable ad hoc location-based services for heterogeneous mobile clients," Wireless Networks, 1999, 5:411-427.

Kreller et al., "A Mobile-Aware City Guide Application," ACTS Mobile Communication Summit, 1998, Rhodes, Greece, 7 pages.

Lusky et al., "Mapping the Present," ColoradoBiz, Nov. 1999, 26(11):16-17.

McCarthy and Meidel, "ACTIVEMAP: A Visualization Tool for Location Awareness to Support Informal Interactions," HUC '99, LNCS 1707, 1999, pp. 158-170.

O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.

Pascoe et al., "Developing Personal Technology for the Field," Personal Technologies, 1998, 2:28-36.

Tarumi et al., "Public Applications of SpaceTag and Their Impacts," Digital Cities, LNCS 1765, 2000, pp. 350-363.

Tebbutt, "Dial your way out of the woods," The Australian, Feb. 2000, 1 page.

Tso et al., "Always on, Always Connected Mobile Computing," Mobile Communications Operation—Mobile Handheld Products Group, 1996, pp. 918-924.

Wang and Lin, "Location Aware Information Agent over WAP," Tamkang Journal of Science and Engineering, 2000, 3(2):107-115.

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

"Report on Location Service feature (LCS) 25.923 v1.0.0," TSG-RAN Working Group 2 (Radio layer 2 and Radio layer 3), Berlin, May 25-28, 1999, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"Enabling UMTS / Third Generation Services and Applications," No. 11 Report from the UMTS Forum, Oct. 2000, 72 pages.

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"Revised CR to 09/31 on work item LCS," ETSI SMG3 Plenary Meeting #6, Nice, France, Dec. 13-15, 1999. 18 pages.

Digital cellular telecommunications system (Phase 2+); Location Services (LCS); Service description, Stage 1 (GSM 02.71) ETSI, Apr. 1999, 22 pages.

Akerblom, "Tracking Mobile Phones in Urban Areas," Goteborg University Thesis, Sep. 2000, 67 pages.

Borsodi, "Super Resolution of Discrete Arrivals in a Cellular Geolocation System," University of Calgary Thesis, Apr. 2000, 164 pages.

Abowd et al., "Context-awareness in wearable and ubiquitous computing," 1st International Symposium on Wearable Computers, Oct. 13-14, 1997, Cambridge, MA, 9 pages.

Balsiger et al., "MOGID: Mobile Geo-depended Information on Demand," Workshop on Position Dependent Information Services (W3C-WAP), 2000, 8 pages.

Cheverst et al., "Architectural Ideas for the Support of Adaptive Context-Aware Applications," Proceedings of Workshop on Infrastructure for Smart Devices—How to Make Ubiquity an Actuality, HUC'00, Bristol, Sep. 2000, 3 pages.

Cheverst et al., "The Role of Connectivity in Supporting Context-Sensitive Applications," HUC'99, LNCS 1707, 1999, pp. 193-209.

Efstratiou and Cheverst, "Reflection: A Solution for Highly Adaptive Mobile Systems," 2000 Workshop on Reflective Middleware, 2000, 2 pages.

Cheverst et al., "The Support of Mobile-Awareness in Collaborative Groupware," Personal Technologies, 1999, 3:33-42.

Cheverst et al., "Design of an Object Model for a Context Sensitive Tourist Guide," Computers and Graphics, 1999, 23(6):883-891.

Cheverst et al., "Developing Interfaces for Collaborative Mobile Systems," 1999, 15 pages.

Cheverst et al., "Experiences of Developing and Deploying a Context-Aware Tourist Guide: The GUIDE Project," 2000, pp. 20-31.

Cheverst et al., "Exploiting Context to Support Social Awareness and Social Navigation," SIGGROUP Bulleting Dec. 2000, 21(3):43-48.

Cheverst et al., "Services to Support Consistency in Mobile Collaborative Applications," Proc. 3rd International Workshop on Services in Distributed Networked Environments, 1996, 8 pages.

Cheverst et al., "Sharing (Location) Context to Facilitate Collaboration Between City Visitors," 2000, 8 pages.

Cheverst et al., "Supporting Collaboration in Mobile-aware Groupware," Workshop on Handheld CSCW, 1998, 6 pages.

Change Request for "U.S. specific Emergency Services requirements included as an informative annex," Nov. 29, 1999, 2 pages.

Costa et al., "Experiments with Reflective Middleware," Proceedings of the ECOOP'98 Workshop on Reflective Object-Oriented Programming and Systems, ECOOP'98 Workshop Reader, 1998, 13 pages.

Davies et al., "L2imbo: A distributed systems platform for mobile computing," Mobile Networks and Applications, 1998, 3:143-156.

Davies et al., "'Caches in the Air': Disseminating Tourist Information in the Guide System," Second IEEE Workshop on Mobile Computer Systems and Applications, Feb. 25-26, 1999, 9 pages.

Dix et al., "Exploiting Space and Location as a Design Framework for Interactive Mobile Systems," ACM Transactions on Computer-Human Interaction (TOCHI)—Special issue on human-computer interaction with mobile systems, 2000, 7(3):285-321.

Drane et al., "Positioning GSM Telephones," IEEE Communications Magazine, Apr. 1998, pp. 46-59.

Drane and Rizos, "Role of Positioning Systems in ITS," Positioning Systems in Intelligent Transportation Systems, Dec. 1997, pp. 312, 346-349.

Efstratiou et al., "Architectural Requirements for the Effective Support of Adaptive Mobile Applications," 2000, 12 pages.

"Estonian operator to launch world's first Network-based location services," Ericsson Press Release, Oct. 11, 1999, 2 pages.

Fischer et al., "System Performance Evaluation of Mobile Positioning Methods," IEEE, Aug. 2002, pp. 1962-1966.

Flinn and Satyanarayanan, "PowerScope: A Tool for Profiling the Energy Usage of Mobile Applications," Proc. WMCSA '99 Second IEEE Workshop on Mobile Computing Systems and Applications, Feb. 25-26, 1999, 9 pages.

French and Driscoll, "Location Technologies for ITS Emergency Notification and E911," Proc. 1996 National Technical Meeting of the Institute of Navigation, Jan. 22-24, 1996, pp. 355-359.

Friday et al., "Developing Adaptive Applications: The MOST Experience," J. Integrated Computer-Aided Engineering, 1999, pp. 143-157.

Gunnarsson et al., "Location Trial System for Mobile Phones," IEEE, 1998, pp. 2211-2216.

Jose and Davies, "Scalable and Flexible Location-Based Services for Ubiquitous Information Access," HUC'99, LNCS 1707, 1999, pp. 52-66.

Klinec and Nolz, "Nexus-Positioning and Communication Environment for Spatially Aware Applications," IAPRS, Amsterdam, 2000, 7 pages.

Kovacs et al., "Adaptive Mobile Access to Context-aware Services," Proc. ASAMA '99 Proc. First International Symposium on Agent Systems and Applications Third International Symposium on Mobile Agents, IEEE Computer Society Washington, DC, 1999, 12 pages.

Kreller et al., "UMTS: A Middleware Architecture and Mobile API/Approach," IEEE Personal Communications, Apr. 1998, pp. 32-38.

Kugler and Lechner, "Combined Use of GPS and LORAN-C in Integrated Navigation Systems," Fifth International Conference on Satellite Systems for Mobile Communications and Navigation, London, UK, May 13-15, 1996, pp. 199-207.

Kyriazakos et al., "Optimization of the Handover Algorithm based on the Position of the Mobile Terminals," Communications and Vehicular Technology, Oct. 2000, pp. 155-159.

Leonhardt and Magee, "Multi-Sensor Location Tracking," MOBICOM 98, Dallas, TX, pp. 203-214.

Leonhardt and Magee, "Towards a general location service for mobile environments," Proc. Third International Workshop on Services in Distributed and Networked Environments, Jun. 3-4, 1996, 8 pages.

Long et al., "Rapid Prototyping of Mobile Context-Aware Applications: The Cyberguide Case Study," MobiCom '96, 1996, 11 pages.

Yokote, "The Apertos Reflective Operating System: The Concept and its Implementation," OOPSLA'92, pp. 414-434.

Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.

Zhao, "Mobile Phone Location Determination and its Impact on Intelligent Transportation Systems," IEEE Transactions on Intelligent Transportation Systems, Mar. 2000, 1(1):55-64.

Microsoft Outlook 2003 User's Guide, http://opan.admin.ufl.edu/user_guides/outlook2003.htm. Aug. 2004, 17 pages.

"Error: could not find a contact with this e-mail address." Outlookbanter.com. Dec. 2006, 12 pages.

Drane et al., "The accurate location of mobile telephones", Third Annual World Congress on Intelligent Transport Systems, Orlando, Florida, Oct. 1996.

"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.

Ygnace et al., "Travel Time Estimation on the San Francisco Bay Area Network Using Cellular Phones as Probes", Working Paper, Institute of Transportation Studies, University of California, Berkeley, 2000.

Wang et al., "A Unified Vehicle Supervising and Traffic Information System", IEEE, 1996, pp. 968-972.

US 6,731,928, 05/2004, Tanaka (withdrawn)

* cited by examiner

LOCATION SPECIFIC CONTENT

BACKGROUND

This disclosure relates to location specific content on a mobile device.

Mobile devices have grown more powerful and feature-rich and now include such features as personal digital assistant (PDA) capabilities, cameras, Internet access, Wi-Fi access, etc. Software applications may be stored and/or run on mobile devices in the same or similar manner as such applications are run on laptop or desktop computers. Unlike conventional cumbersome computers, the mobility of such devices enables applications that provide features based on the mobility of such devices. For instance, location-based services have been developed for determining and tracking the locations of users of mobile devices.

Location-based services provide location-specific information to mobile devices. For instance, a mobile device user can use a mapping program and global positioning system (GPS) data to identify the location of the mobile device on a map of a geographic region. Use of mapping software requires that the software be previously installed on the device such that it is operable in any location.

Despite the mobile nature of such devices, and the ability of such devices to know their location and/or access networks (e.g., via public or private Wi-Fi), users are still restricted to applications that are installed on the device, or which the user has decided to install for permanent use.

SUMMARY

In one aspect, systems, methods, apparatuses and computer program products are provided that enable content, such as applications, to appear and disappear on a mobile device depending on the presence of a mobile device within a Wi-Fi network, and/or based on a location of the device.

In one aspect, methods are disclosed, which include steps such as: communicating location information associated with a device to a server; receiving at the device content identified by the server, the content comprising an application associated with the location information; and presenting the received content on a display of the device only while the device is at or near a particular location identified by the location information.

According to some features, the method can include removing the presentation of the content when the device is no longer at or near the particular location. Receiving the content can include receiving the content from a content service, the content service identified by the server. Alternatively or additionally, the content can be received from the server. According to another feature, the content identified by the server can include a uniform resource locator (URL), a web clip, or an application. The application can be associated with the particular location. The location information can be identified and/or received from a positioning system. The positioning system can: derive the location information from satellite data received from a plurality of satellites, use dead reckoning to derive the location information; or use a wireless signal strength of the device to derive the location information. According to yet another feature, the location information can be identified by communication of the mobile device with a wireless access point.

In another aspect, methods are disclosed, which include steps such as: receiving, at a mobile device, beacon data from a wireless access point, wherein the beacon data comprises a URL; when the mobile device is within a range of the wireless access point, presenting content on the mobile device associated with the URL; and upon user selection of the content, receiving an application for execution on the mobile device.

According to some features, the method can include executing the application. The application, in some features, may be executed only if the mobile device is within the geographical range of the wireless access point. According to another feature, the method can include receiving the user selection at the mobile device. According to yet another feature, the method can include removing the content presentation when the mobile device is no longer within the range of the wireless access point. The wireless access point can include a Wi-Fi access point. Receiving an application can include receiving an application from a content service, and/or from the wireless access point. The application can include a web clip.

In yet another aspect, a system is disclosed. The system includes: a positioning system operable to derive location information associated with a device; a location mapping service operable to store content associated with one or more locations of the device; a communications interface operable to communicate location information associated with the device to a server, the communications interface being further operable to receive at least some of the content from the server based on the location information; and a user interface operable to present the received content on the device when the device is at or near a location identified by the location information.

According to a feature, the content includes a URL or a web clip. The content can alternatively or additionally include video content, picture content, audio content, multimedia content or routing content associated with a geographical area within a proximate distance to the device based on the location information. According to another feature, the user interface is operable to present the received content on the device only when the device is at or near a location identified by the location information. The location information can be identified and/or received from a positioning system. The positioning system can: derive the location information from satellite data received from a plurality of satellites, use dead reckoning to derive the location information; or use a wireless signal strength of the device to derive the location information.

According to still another aspect, a system is disclosed. The system includes: a wireless access point, the wireless access point transmitting beacon data comprising a URL; a mobile device operable to receive the beacon data when the mobile device is within a range of the wireless access point; and a user interface operable to display content on the mobile device, the content associated with the URL.

According to a feature, the system can also include an application for execution on the mobile device upon user selection of the content. The content can include a URL, a web clip, video content, picture content, audio content, multimedia content, and/or routing content associated with a geographical area within a proximate distance to the device based on the location information. According to another feature, the user interface is operable to display the content on the mobile device only when the mobile device is at or near the wireless access point.

Systems, methods and computer program products enable content, such as applications, to automatically appear and disappear on a mobile device depending on the location of the device. This permits a user to view and/or interact with applications associated with a particular location. As an example, a user who enters a library with a mobile device may be presented with an application on the device that enables the user to search the library's digital card catalog. Upon exiting the library the application may be automatically removed such that the application is not permanent on the user's mobile device. These features enable the mobile device to make applications available when and where they are most useful to users.

DETAILED DESCRIPTION

Figure 1:
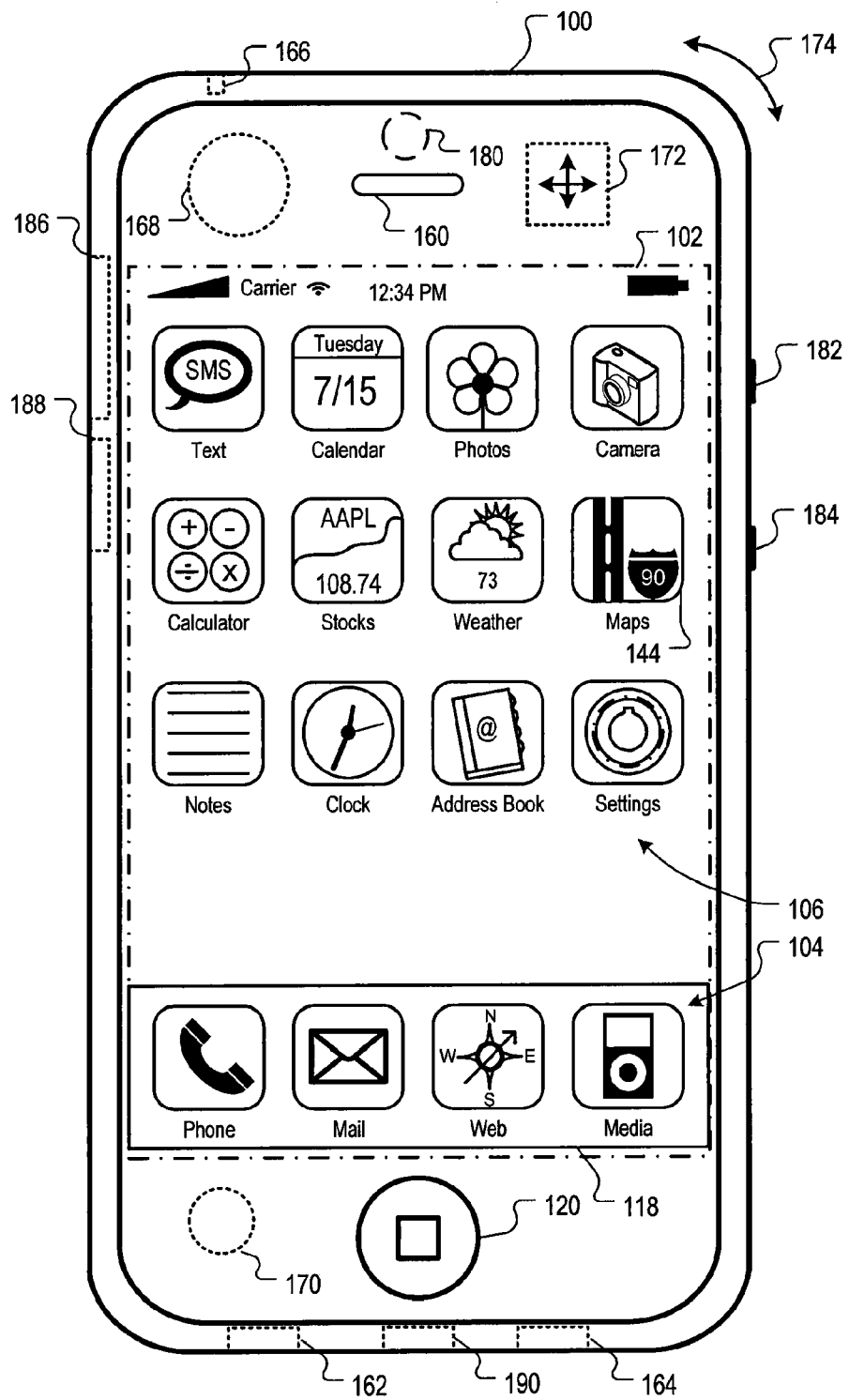
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Exemplary Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate handsfree voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
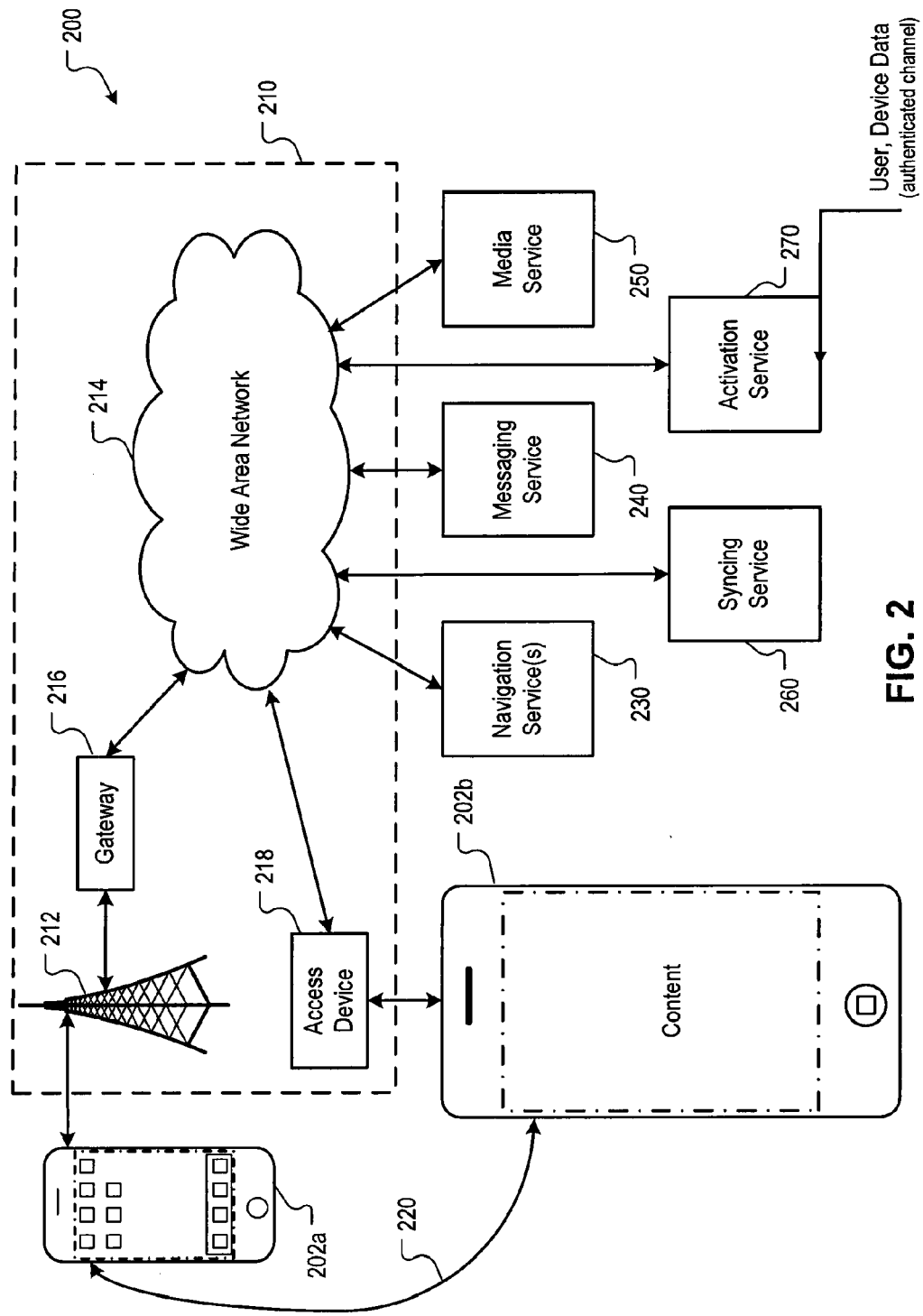
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point device 218, such as an 802.11g wireless access point device, can provide communication access to the wide area network 214. In some implementations, both voice and data communications can be established over the wireless network 212 and the access point device 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point device 218 and the wide area network 214. In some implementations, the mobile device 100 can be physically connected to the access point device 218 using one or more cables and the access point device 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Exemplary Mobile Device Architecture

Figure 3:
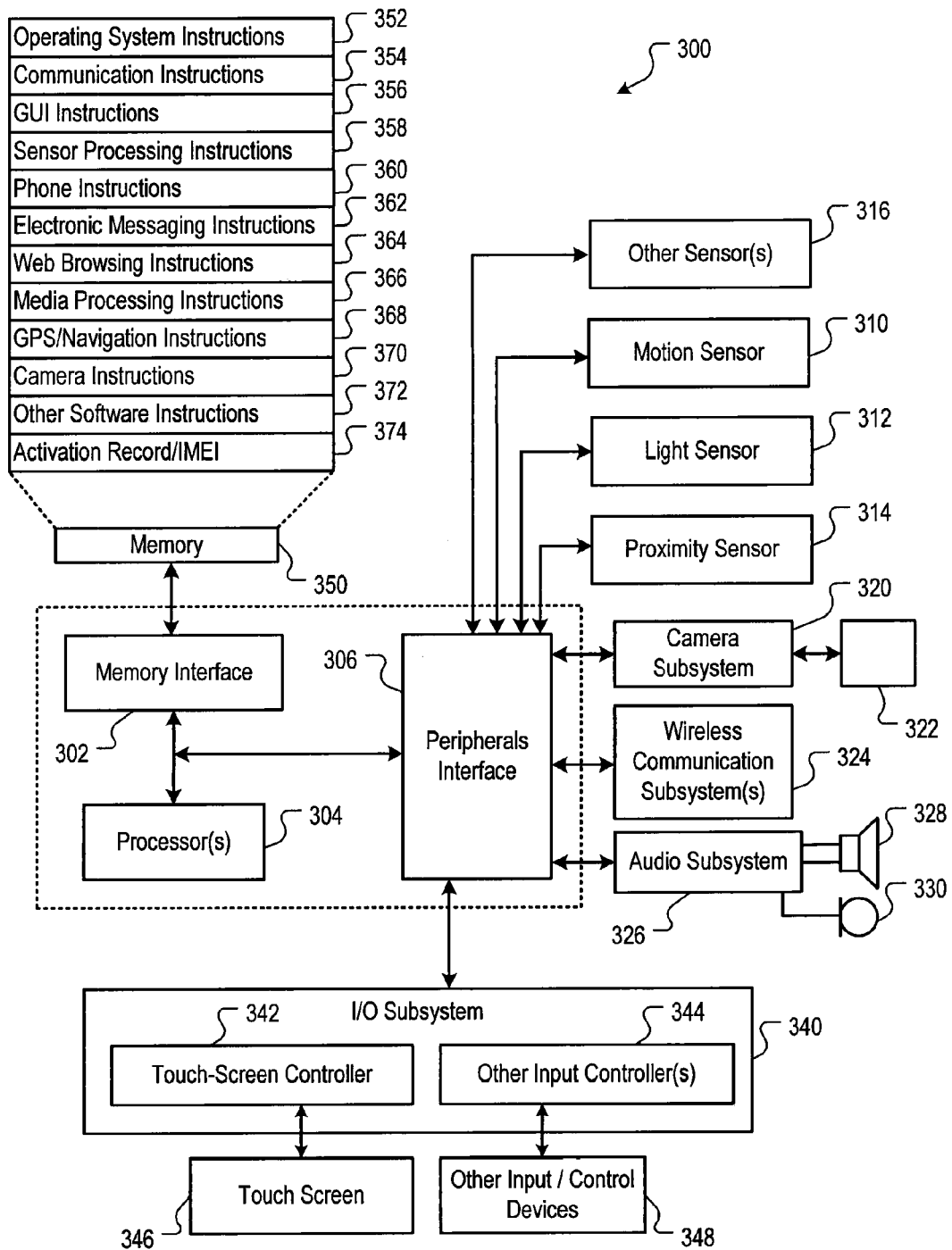
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some embodiments, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

The memory 350 can also include a preferences engine 374. The preferences engine 374 can be operable to receive user preferences as to the sorts of content the user is interested. In some implementations, the preferences can be used to filter the sorts of information that is sent to the mobile device 100. For example, the user might indicate a preference for local music. Thus, when local music is available the mobile device 100 can retrieve available local music. In another example, the user might indicate a preference not to receive video, route or image content when in a specified area (e.g., hometown, familiar city, etc.), but to receive route and image content when outside of their specified area. These preferences can be communicated to a media service (e.g., media service 250 of FIG. 2), and can be used by the media service to provide relevant media content based on location and/or preferences.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Location Specific Content

Figure 4A:
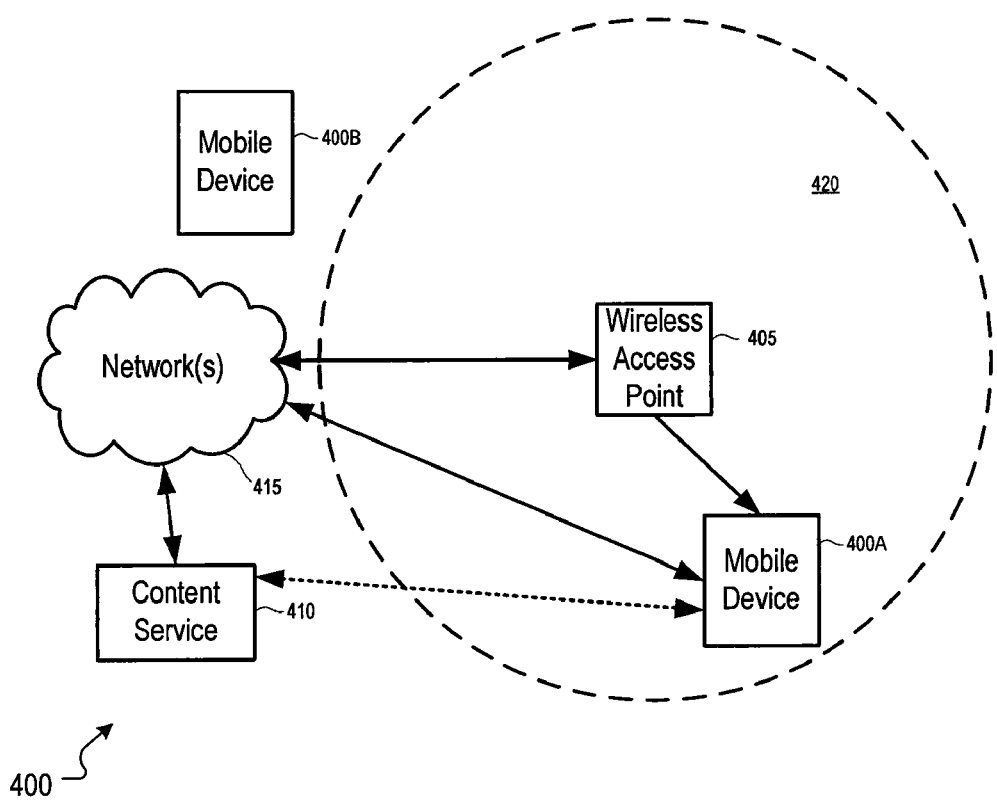
FIG. 4A is a block diagram illustrating an example system for delivering location-specific applications to a mobile device.

FIG. 4A is a block diagram illustrating an example system 400 for delivering location-specific content, such as location-specific applications, to one or more mobile devices, such as the mobile device 100 described with respect to FIGS. 1-3. The system 400 includes a wireless access point (WAP) 405 that permits wireless communication devices, such as a mobile device 400A, to connect to a wireless network using Wi-Fi, Bluetooth and/or other well known standards. Wireless devices can connect to the wireless network when they are within range of the WAP 405, i.e., they can receive signals from and communicate with the WAP 405. The WAP 405 can connect to one or more other network(s) 415, such as a wired network, and can relay data between mobile devices and the one or more networks 415. Additionally, a content service 410 may be in communication with the WAP 405 and/or mobile device 400A within range of the WAP 405 through the one or more networks 415.

As shown in FIG. 4A, the WAP 405 transmits wireless signals such that devices within a surrounding geographic area 420 can communicate with the WAP 405. For instance, a first mobile device 400A that is located within the geographic area 420 in range of (i.e., capable of communicating with) the WAP 405 can communicate with the WAP 405, while a second mobile device 400B outside of the geographic area 420 cannot. According to some implementations, the WAP 405 can represent a Wi-Fi access point, such that the geographic area 420 represents a hotspot. According to some implementations, the WAP 405 permits unrestricted, public access to mobile devices, such as free hotspots made available at a restaurant, airport, and the like. In other implementations the WAP 405 is restricted such that some authentication is required using known network security processes before a mobile device can communication through the WAP 405.

According to some implementations, a mobile device, such as the mobile device 400A located within the geographic area 420, can automatically display new content, including icons representing web clips, on mobile devices when the devices enter and/or remain in the geographic area 420. Similarly, such content may disappear from mobile devices when devices exit the geographic area 420. Thus, the display of content on a mobile device can be location dependent, where the location may be defined as within range of (i.e., capable of communicating with) the WAP 405. According to some implementations the content is provided by the WAP 405. Content can also be pushed and/or retrieved from the content service 410 to mobile devices in communication with the WAP 405.

In some implementations, content can be included in beacon data broadcast from the WAP 405 to mobile devices within the geographic area 420 of the WAP 405. Beacon data from WAPs generally includes a data transmission including a service set identifier (SSID), channel number, and security protocols such as WEP (Wired Equivalent Protection) or WPA (Wi-Fi Protected Access). Beacon data can also include a URL. The beacon data can be received by any mobile device, such as the mobile device 400A shown in FIG. 4A, that is within the geographic area 420 that acts as a client device.

A URL received by a mobile device from a WAP 405 in beacon data can be used by an application on a mobile device, such as a web browser, to automatically lookup the web site identified by the URL. In some implementations, subsequent to receiving the URL, the mobile device can communicate with and examine the web site to identify a site-based icon file that can be used as art to display an icon representing the content. A screen shot of the URL could also be scaled down when a site-based icon file is not available. According to yet another implementation, the icon image could be transmitted to the mobile device from the WAP 405.

The mobile device can create a new storage location on the mobile device in which to store information associated with the URL, including, for instance, the icon and the URL. The name of the content can also be stored on the device. Content identified by the URL received via the beacon can automatically appear on the mobile device. The content is selectable by a user of the device, such as by touching, tapping or otherwise selecting the content. Additional content downloaded from the URL, such as from the content service 410, can also be stored in the new storage location.

Figure 5A:
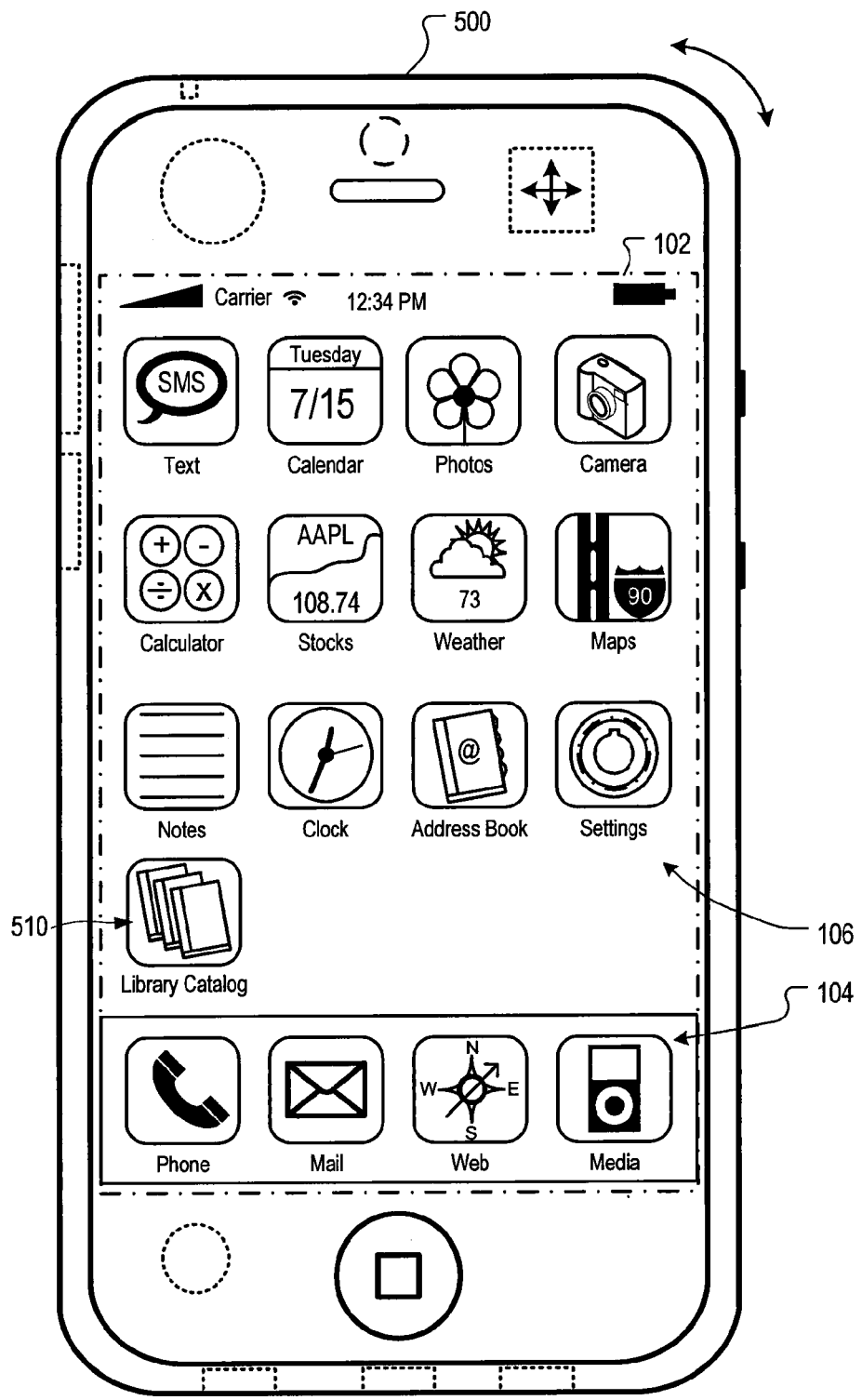
FIG. 5A is a block diagram of an example mobile device.

An example mobile device 500 which includes content 510 identified by a URL received via beacon data is shown in FIG. 5A. The content in FIG. 5 includes an icon 510, which is a display object on the touch sensitive display 102 of the mobile device. In the illustrative example of FIG. 5A, the content includes a user-selectable icon 510 corresponding to a library catalog. This could appear, for instance, on the mobile device 500 when carried by a user into a library having a WAP 405. When the icon 510 is selected, a library catalog application will launch on the mobile device 500 to permit a user of the mobile device to search the library catalog.

Referring again to FIG. 4A, in some implementations, a user can select an icon transmitted to a mobile device from the WAP 405, which in turn opens a link to the URL using, for instance, a web browser. According to some implementations, a user selection of an icon loads a web application. A web application is a browser-based application that can load in a web page or can be configured to look like an application rather than appearing to a user of the mobile device to load within a browser. In some implementations the URL identifies the content service 410. Therefore, upon selection of a URL provided by the WAP 405, a mobile device 400A can be directed to the content service 410, which can automatically download a content, such as an application, video content, picture content, audio content, multimedia content or routing content associated with a geographical area within a proximate distance to the mobile device based on the location information, and/or other media to the mobile device 400A for display to a user of the device. The content may be downloaded, as illustrated in FIG. 4A, from the content service to the mobile device 400A via the WAP 405. As shown by the dotted line in FIG. 4A, the content service 410 may also wirelessly transmit content directly to the mobile device 615. According to some implementations, a user may have to consent to the downloading of an application, or choose to download an application displayed as available on the display of the mobile device, prior to downloading occurring.

Content may be downloaded to and executed on mobile devices within the geographical area 420. Content can also remain on the content service 410 and be accessed by the mobile device 400A. For instance, content displayed on the mobile device 400A can represent web-based, hosted content viewable and/or executable on the mobile device. Therefore, location-specific content made available to mobile devices within the range of a WAP 405 can be hosted and/or stored at any accessible network location, including at the WAP 405, the content service 410, other network locations accessible from the network(s) 415, and/or on the mobile device 400A itself.

It will be appreciated that the transmission of a URL in beacon data from a WAP to a mobile device enables the identification of content to mobile devices within the range of the WAP 405 without requiring the system 400 to provide a database mapping location information of mobile devices to URLs or other content.

In the implementation shown in FIG. 4A, content will appear on a display of the mobile device 400A within the range of the WAP 405, and will disappear when the mobile device 400A leaves the geographic area 420. Thus, according to some implementations, storage on the mobile device 400A can retain a URL, icon, and other content only while the beacon data continues to be received at the device 400A from the WAP 405. The presence of the beacon data can be routinely confirmed by the mobile device. However, in some implementations a user can be queried to determine if the user wishes to permanently store content on the mobile device 400A even after the user departs the geographic area 420; if the WAP 405 and/or content service 410 consents to such permanent storage and use, the content can remain on the mobile device 400A.

Optionally, a user can define preferences on a mobile device that include information such as what type of content or from what sources a user associated with the mobile device is interested in receiving. Thus, the user can set up the mobile device to receive only certain kinds of content and/or content from certain types of content providers. In some implementations a user can define preferences on a mobile device that permits the user to ignore content corresponding to a particular WAP 405 or from a particular source. According to some implementations, upon receipt of beacon data that includes a URL or other content, a user may be presented with one or more icons or buttons on the mobile device to permit the user to ignore the content.

Additionally, although not described in detail herein, the loading of content can be effected over secure communication methods. Additionally, in some implementations, content downloaded to the mobile device 400A may require that the mobile device subsequently communicate with the content service 410, and those communications may be secure as well. The use of authentication processes may be required before accessing the WAP 405 and/or content service 410, and a certificate on the mobile device may be required. As an example, the geographic area 420 can represent the area within or around a retail store. Using the system 400, all customers may be able to view content identifying what products are on sale, while authenticated employees of the retail store could view inventory items.

Figure 4B:
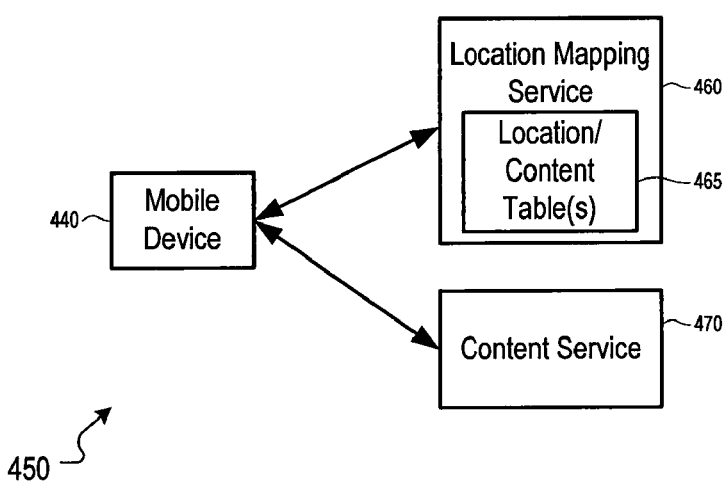
FIG. 4B is a block diagram of illustrating another example system for delivering location-specific applications to a mobile device.

FIG. 4B is a block diagram of illustrating another example system 450 for delivering location-specific applications to a mobile device 440. As described above, in some implementations, a mobile device 440 can receive positioning from a positioning system (not illustrated in FIG. 4B). Based on the location information identified by the positioning system, the mobile device 440 can receive location-specific content while the device is at or near a particular location identified by the location information. Thus, mobile devices need not be located near a wireless access point, such as the wireless access point 405 described with respect to FIG. 4A, to display location-specific content on the mobile device to a user.

According to some implementations, once location information for the mobile device is identified, content associated with the location of the device can be identified by a server that receives the location information from the device. The server can include a location mapping service 460. The location mapping service can include one or more databases that include one or more location/content tables 465 that correlate geographical locations to content to identify content, if any, that should be transmitted to the mobile device 440 while the device is at or near a particular location identified by the location information. For instance, the location/content tables could identify that content, such as text, images, and the like, associated with a national park should be transmitted to mobile devices that are located within the geographical area of the park or within a ¼ mile from the center of the park.

To effect the identification of content, the location mapping service 460 identifies the current location of a mobile device from location information, and compares the location information to geographical location data in the location/content tables 465 to determine if the location data satisfies, i.e., falls within, the geographical location data. Location information and geographical location data can be identified, for instance, using latitude and longitude data. Once the location information is determined by the location mapping service 460 to satisfy geographical location data, the location mapping service 460 identifies content corresponding to the satisfied geographical location data.

According to some implementations, the location/content tables 465 can identify URLs associated with location information. The service 460 can communicate the URLs to the mobile device 440, which can use the URLs to access content from a content service 470 in the same manner as described above in the system 400 of FIG. 4A. For instance, a browser on the mobile device 440 can use the URL to access a web page, and content thereon, provided by the content service 470.

Similar to the system 400 of FIG. 4A, content may also be presented only while the device is at or near a particular location identified by the location information. Therefore, location information can be routinely transmitted to the location mapping service, such as once every minute, five minutes, or on other intervals, to identify if the location of the mobile device 440 has changed. If so, the location mapping service can transmit a signal identifying new content to the mobile device and/or removing content from the mobile device that was previous received by the device 440.

Other features of the system 450 may be similar to the system 400 described with respect to FIG. 4. For instance, in some implementations a user can define preferences on a mobile device. The preferences permit the user to ignore content corresponding to one or more locations or from a particular source. According to some implementations, upon receipt of content corresponding to a particular location, such as a URL or other content, a user may be presented with one or more icons or buttons on the mobile device to permit the user to ignore the content.

Figure 5B:
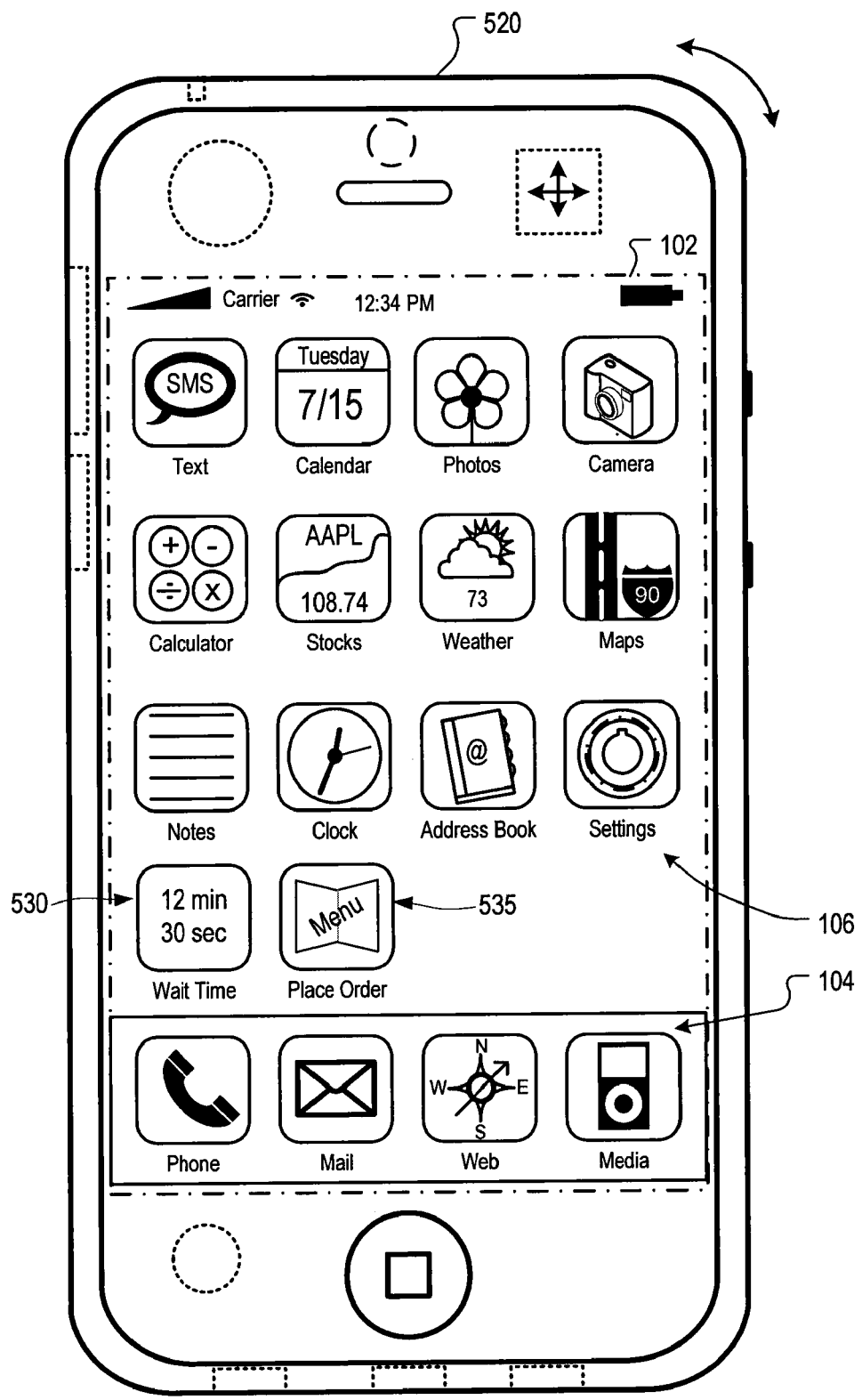
FIG. 5B is a block diagram of another example mobile device.

An example mobile device 520 that includes content identified in a database associated with a location of a mobile device is shown in FIG. 5B. The content 530, 535 in FIG. 5B includes icons, which is a display object on the touch sensitive display 102 of the mobile device. In the illustrative example of FIG. 5B, the content includes user-selectable icons 530, 535 corresponding to a timer and a menu. These icons could appear, for instance, when the mobile device 500 is in or near a restaurant. The user of the device may, for instance, view a seating wait time icon 530 that displays the estimated wait time before being seated. This may be displayed, for instance, where a user of the device provides a PIN, telephone number, or other identification information to a restaurant hostess, or alternatively, identifies that the user is waiting electronically using the mobile device. The place order icon 535 may be selected by a user of the device 520 to view and place an order for food electronically. For instance, the content service may include order software associated with the restaurant, which the user can access via the place order icon 535 to submit a food order electronically to the restaurant. Because these icons 530, 535 automatically appear on the device 520 when the user is at the restaurant, the user does not need to pre-configure and/or pre-download content to the device prior to arriving at the restaurant.

According to some implementations, a combination of the features of the systems 400, 450 described in FIGS. 4A and 4B may be used to effect the display of location-specific content on a mobile device. For instance, in the system of FIG. 4A a URL may not be transmitted to the mobile device 400A within the geographical area 420. Instead, the mobile device 400A may receive an icon via the beacon data, and subsequent o user selection of the icon, a URL can be identified by a lookup procedure that identifies the URL in a location/content database that associates the location information and/or identity of the WAP 405. For instance, the location of the WAP 405 may be stored in a database, which then associates content, such as a URL, with the WAP so that content specific to the location of the WAP is served to mobile devices in the vicinity of the WAP.

According to some implementation, mobile devices can be identified by the networks 415 using a zero configuration networking such as MDNS. The use of MDNS, for instance, would permit the mobile device to identify itself and connect to the network such that the content service can communicate with the mobile device. According to some implementations, a MDNS host could identify the location of content to a mobile device for retrieval and/or downloading by the mobile device this could occur, for instance, if the mobile device has accessed a base station.

According to other implementations, mobile devices can be identified using Bluetooth, which can provide content, such as URLs, to a mobile device having Bluetooth capabilities. Therefore, it will be appreciated that other protocols and wireless networks other than Wi-Fi may be used to implement the features described herein. In other implementations barcode data can be used to identify content, such as URLs. For instance, a mobile device can include a camera or barcode scanner that is operable to scan a barcode, and use the barcode to identify content, such as a URL. One or more databases, such as those described with respect to FIG. 4B, can associate barcodes with URLs or the location of additional content.

In still other implementations content can be transmitted to a mobile device over a physical connection, for instance, through a docking station to which the mobile device is attached. For instance, a universal serial bus (USB)/30 pin dock can be used to transmit content, such as a URL, to a mobile device. In such an implementation, the location of the mobile device because of the fixed connection to a dock. Therefore, the content can be based on the location of the dock as an alternative to identifying the location of the mobile device through location information.

Example Methods for Presenting Location Specific Content

Figure 6:
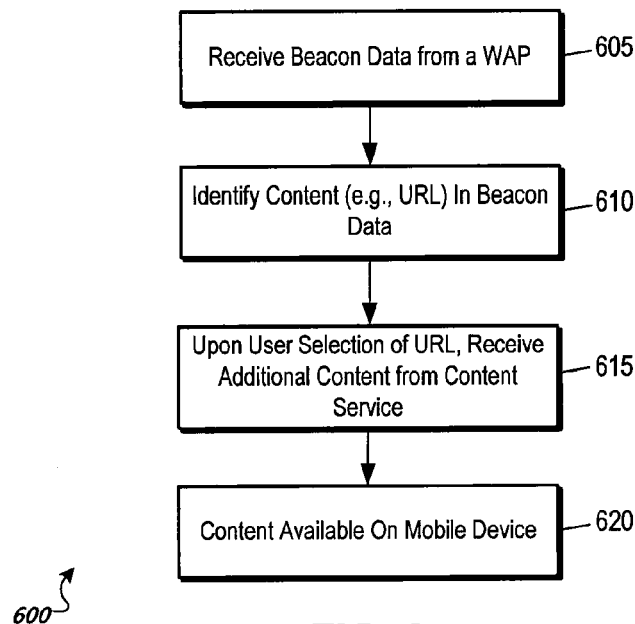
FIG. 6 is a flowchart illustrating an example method for presenting content on a mobile device.

FIG. 6 is a flowchart illustrating an example method for presenting content on a mobile device. In some implementations, each stage of the method occurs only while a mobile device is in communication, i.e., within the range of, a WAP, such as the WAP 405 shown in and described with respect to FIG. 4A.

In step 605, beacon data is received from a wireless access point 605 wirelessly by the device, such as the mobile device 100 in FIG. 1. Content within the beacon data, such as a URL, is identified by the mobile device 610. As an example, the WAP can provide one or more URLs to the mobile device in the beacon data, which may then be selected by a user and used by the mobile device to access additional content from a content service 615, such as content service 410, which is also operable to wirelessly transmit content that is received by the mobile device either directly or through a wireless access point. Content can be received, for example, by the mobile device (e.g., mobile device 100) operating in conjunction with communication instructions (e.g., communication instructions 354 of FIG. 3) and the wireless communication subsystem (e.g., wireless communication subsystem 324 of FIG. 3).

The received content is available, e.g., presented on a display of the mobile device 620, while the device is within the range of the WAP. The content can be presented, for example, by the mobile device (e.g., mobile device 100) operating in conjunction with graphical user interface instructions (e.g., GUI instructions 356 of FIG. 3) along with a touch screen (e.g., touch screen 346 of FIG. 3) and/or an audio subsystem (e.g., audio subsystem 326 of FIG. 3). The presentation of the content can be based upon user input received using the touch screen user interface.

Figure 7:
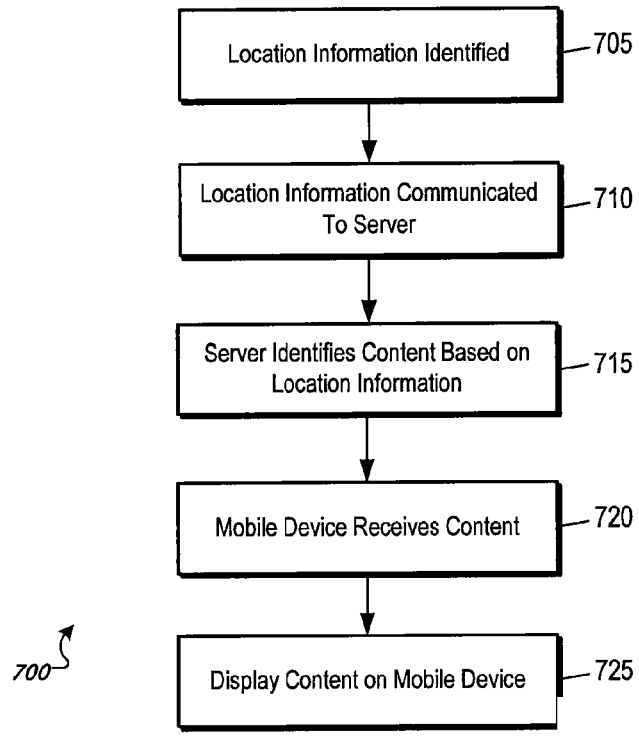
FIG. 7 is a flowchart illustrating another example method for presenting content on a mobile device.

FIG. 7 is a flowchart illustrating another example method 700 for presenting content on a mobile device. The process beings with the identification of location information 705, for instance, based on a positioning system (e.g., positioning system 318 of FIG. 3). The location information is the communicated to a server 710, for instance, the location mapping service 460 shown in FIG. 4B. The location information can be communicated, for example, by a mobile device (e.g., mobile device 100 of FIG. 1) using communication instructions (e.g., communication instructions 354 of FIG. 3) operating in conjunction with a wireless communication system (e.g., wireless communication subsystem 324 of FIG. 3).

The location information is used by the server, such as the location mapping service 460, to identify content 715 corresponding to geographical location data corresponding to the location of the mobile device as identified to the location information. For instance, content associated with the location of the mobile device may be identified in one or more databases, such as the location/content tables 465.

The server, for instance, the location mapping service 460, transmits content that may be received by the mobile device 720. As an example, the location mapping service 460 can provide one or more URLs to the mobile device, which may then be used by the mobile device to access additional content from a content service, which is also operable to wirelessly transmit content that is received by the mobile device 720. Content can be received 720, for example, by the mobile device (e.g., mobile device 100) operating in conjunction with communication instructions (e.g., communication instructions 354 of FIG. 3) and the wireless communication subsystem (e.g., wireless communication subsystem 324 of FIG. 3). In additional implementations not illustrated in FIG. 7, the mobile device can filter the content based on preferences, or one or more authentication procedures may be required to receive the content.

The received content is presented on a display of the mobile device 725 while the device is at or near a particular location identified by the location information. The content can be presented, for example, by the mobile device (e.g., mobile device 100) operating in conjunction with graphical user interface instructions (e.g., GUI instructions 356 of FIG. 3) along with a touch screen (e.g., touch screen 346 of FIG. 3) and/or an audio subsystem (e.g., audio subsystem 326 of FIG. 3). The presentation of the content can be based upon user input received using the touch screen user interface.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method comprising:
communicating location information associated with a device to a server;
receiving, at the device, content identified by the server, the content comprising an application associated with the location information; and
providing an icon for display on the device only while the device is at or near a particular location identified by the location information, the icon operable to, upon receiving an input, cause the device to activate the application.

2. The method of claim 1, further comprising:
removing the icon when the device is no longer at or near the particular location.

3. The method of claim 1, wherein receiving the content comprises receiving the content from a content service, the content service identified by the server.

4. The method of claim 1, wherein:
receiving the content comprises receiving a uniform resource locator (URL), and
the method comprises generating the icon, including:
creating a screenshot of a destination of the URL and designating a scaled down version of the screenshot as the icon.

5. The method of claim 4, wherein:
the uniform resource locator is received through a beacon signal from an access point, and
providing the icon for display comprises providing the icon for display for a duration in which the device receives the beacon signal.

6. The method of claim 1, wherein the content identified by the server comprises a web clip.

7. The method of claim 1, wherein providing the icon for display comprises providing the icon for display on a top-level graphical user interface outside of a map display object.

8. The method of claim 1, wherein the application is provided by a service provider located at or near the location.

9. The method of claim 1, wherein the location information is identified by a global positioning system on the device.

10. The method of claim 1, further comprising receiving location information from a positioning system.

11. The method of claim 10, wherein the positioning system derives the location information from satellite data received from a plurality of satellites.

12. The method of claim 10, wherein the positioning system uses dead reckoning to derive the location information.

13. The method of claim 10, wherein the positioning system uses a wireless signal strength of the device to derive the location information.

14. The method of claim 1, wherein the location information is identified by communication of the device with a wireless access point.

15. A system comprising:
a positioning system operable to derive location information associated with a device;
a communications interface operable to communicate location information associated with the device to a server, the communications interface being further operable to receive content from the server based on the location information, the content comprising an application associated with the location information; and
a user interface operable to provide an icon for display on the device when the device is at or near a location identified by the location information, the icon operable to, upon receiving an input, cause the device to activate the application.

16. The system of claim 15, wherein the content comprises a URL or a web clip.

17. The system of claim 15, wherein the content comprises video content, picture content, audio content, multimedia content or routing content associated with a geographical area within a proximate distance to the device based on the location information.

18. The system of claim 15, wherein the user interface is operable to present the received content on the device only when the device is at or near a location identified by the location information.

19. The system of claim 15, wherein the positioning system is operable to derive the location information from satellite data received from a plurality of satellites.

20. The system of claim 15, wherein the positioning system uses dead reckoning to derive the location information.

21. The system of claim 15, wherein the positioning system uses a wireless signal strength associated with the device to derive the location information.

22. The system of claim 15, wherein the user interface is operable to display the content on the device only when the device is at or near a wireless access point.

23. A computer program product encoded on a non-transitory medium operable to cause one or more processors to perform operations comprising:
   communicating location information associated with a device to a server;
   receiving, at the device, content identified by the server, the content comprising an application associated with the location information; and
   providing an icon for display on the device only while the device is at or near a particular location identified by the location information, the icon operable to, upon receiving an input, cause the device to activate the application.

24. The product of claim 23, wherein:
   receiving the content comprises receiving the content from the server a uniform resource locator (URL), and
   the operations comprise generating the icon, including:
      creating a screenshot of a destination of the URL and designating a scaled down version of the screenshot as the icon.

* * * * *